A. H. SMITH.
PRESSURE GAGE FOR ENGINE CYLINDERS.
APPLICATION FILED DEC. 11, 1915.
1,230,527.
Patented June 19, 1917.
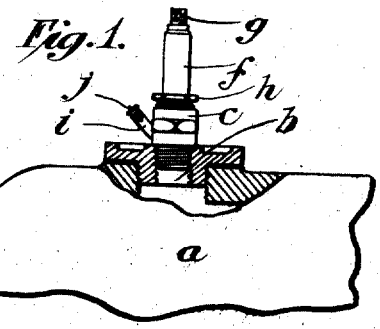
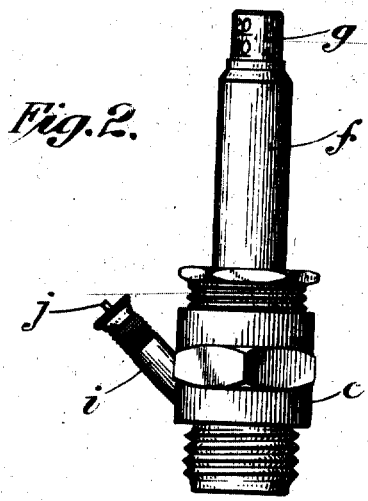
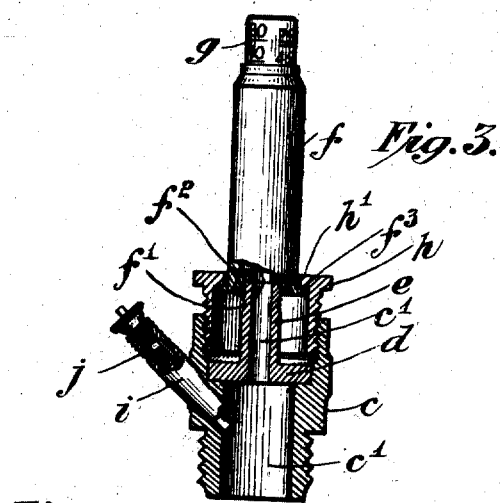
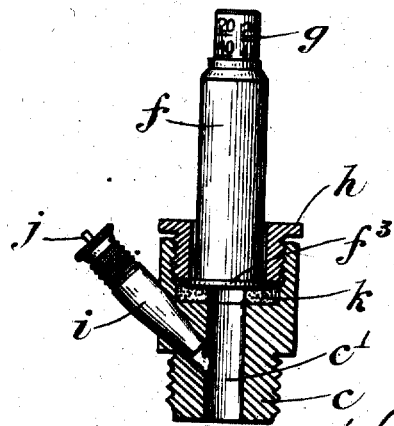

UNITED STATES PATENT OFFICE.

AMOS H. SMITH, OF NEW YORK, N. Y.

PRESSURE-GAGE FOR ENGINE-CYLINDERS.

1,230,527.

Specification of Letters Patent. Patented June 19, 1917.

Application filed December 11, 1915. Serial No. 66,247.

*To all whom it may concern:*

Be it known that I, AMOS H. SMITH, a citizen of the United States, residing at the borough of Bronx, in the city of New York, county of Bronx, and State of New York, have invented certain new and useful Improvements in Pressure-Gages for Engine-Cylinders, of which the following is a specification, reference being had therein to the accompanying drawings, which form a part thereof.

My invention relates to pressure gages for engine cylinders and more particularly to a gage to be carried in the tool chest of an automobile.

There has heretofore been devised a gage by means of which internal combustion engine cylinders may be tested to determine their compression, which gage was adapted solely for this use and was so finely adjusted as to accurately determine the pressure within any cylinder during the compression stroke of the piston.

A gage made in accordance with my invention is designed primarily for use by the driver of an automobile for determining, not the exact effective compression within the cylinder, but the approximate degree of compression and any substantial variance in the compression within different cylinders of an engine. The gage is so constructed that it may be applied to a cylinder by means of a fitting coöperating with the spark plug opening and be held in position so that the user may turn the engine over by hand, the gage itself being of that construction ordinarily used in determining tire pressures, wherein, when the maximum pressure has been registered, the indicator is set in a fixed position so that the pressure may be determined by a subsequent reading of the gage. The fitting by means of which the attachment of the gage to the cylinder is secured, is so constructed that if desired the gage proper may be removed therefrom and be used as an ordinary tire pressure gage, the device thus combining in one article both a cylinder pressure gage and a tire pressure gage. In addition to the characteristics above referred to, I preferably so construct a gage made in accordance with my invention that it may be used for testing an engine cylinder to determine the condition of the piston rings and the maximum pressure or compression which may be developed in a cylinder, without modifying the structure of the device as used in determining the pressure developed within the cylinder upon the compression stroke of the piston. A device made in accordance with my invention is simple in its design, may be readily applied to, and removed from, an engine cylinder and may be inexpensively produced while being sufficiently accurate in its measurements of the pressures to be satisfactory for ordinary tests.

The invention consists in such novel features of construction and combination of parts as are hereinafter set forth and described and more particularly pointed out in the claims hereto appended.

Referring to the drawings:—

Figure 1 is a view of an engine cylinder with a pressure gage made in accordance with my invention applied thereto;

Fig. 2 is an elevation of the gage upon a larger scale;

Fig. 3 is a similar view showing the plug fitting in vertical section and the gage proper broken away toward the bottom thereof; and Fig. 4 is a similar view of a modified form of the invention.

Like letters refer to like parts throughout the several views.

In the embodiment of my invention shown in the accompanying drawings, $a$ indicates one cylinder of an internal combustion engine having a spark plug opening $b$ therein. Secured in said spark plug opening $b$ is a plug fitting $c$, the exterior form of which is substantially like that of a spark plug adapted to be used in connection with the type of cylinder with which the gage is adapted to be used. Ordinarily the opening $b$ and the fitting $c$ will be provided with coöperating screw threads, although other means of attachment, such as the ordinary bushings or quick detachable connections, may be used if desired. Said plug $c$ may be made of ordinary standard sizes for different types of cylinders, and is so constructed as to be interchangeable with a spark plug.

The plug $c$ has a passage extending axially therethrough, the upper end of said passage preferably being of a diameter sufficiently small to limit the application of pressure within an engine cylinder to a restricted pressure receiving surface or area of the gage. In the form of the invention shown in Figs. 1 to 3, the plug or fitting $c$ is shown as being composed of two parts, an outer shell having a hole of large diameter toward the top thereof and a hole of small diameter toward the bottom thereof, a partition $d$ having a hollow nipple $e$ being secured within said shell with a driving or other fit so as to form a tight joint about said partition. In this form of the invention the opening $c'$ extends through the lower portion of the shell and through said partition and said nipple, the portion thereof extending through said partition and said nipple being of smaller diameter than the portion in the shell. This construction, however, is a mere structural detail. The nipple $d$ in this form of the invention is preferably provided with exterior screw threads and extends to a point slightly above the top of the shell of the plug $c$. In the form of the invention shown in Fig. 4 the passage $c'$ is shown as being of a uniform diameter throughout. The top of the nipple $e$ is faced off to form a packing ring adapted to contact with the elastic packing of the gage proper, this nipple being provided primarily to permit the use of an ordinary push gage, or an ordinary gage provided with a screw threaded socket.

Mounted in the fitting $c$ in communication with the interior of the cylinder $a$, through the opening $c'$ is an ordinary push tire pressure gage, having a fixed shell $f$, and a movable or sliding member $g$ provided with graduations thereon adapted to be moved when pressure is applied thereto, and to remain in any position irrespective of subsequent reductions of pressure. The type of gage shown is old and well known, and a detailed description thereof will not therefore be entered into, excepting to point out that the shell $f$ of this type of gage has a bottom opening $f'$ therein, and a packing $f^2$ adapted to contact with the nipple $e$.

While I prefer to use the nipple $e$ as adapting the fitting for use with practically all types of tire pressure gages, any other means may, if desired, be used to secure the desired tight packing between the plug fitting and the gage proper, such as is shown in the modification shown in Fig. 4.

In the preferred form of the invention the shell $f$ is provided with a laterally extending flange $f^3$ adapted to be engaged by the overhang $h'$ upon a screw threaded bushing $h$, the screw threads of which coöperate with screw threads on the portion of the plug $c$ above the partition $d$.

Carried by the plug $c$ is a laterally extending nipple $i$ communicating with the axial opening $c'$ within said plug. By means of this nipple, the pressure within the cylinder may be raised by means of a pump or pressure tank. This nipple $i$ is provided with an ordinary check valve $j$ so that when the device is used for determining the compression within a cylinder, there can be no leakage through said nipple.

In the modification shown in Fig. 4 of the drawings, the construction is substantially like that heretofore described with the exception that instead of using a screw threaded nipple $e$ for securing the desired application of the pressure to the gage proper, I dispense with said nipple and provide an elastic packing ring $k$ about the upper end of the opening $c'$ and I also dispense with the overhang $h'$ on the bushing $h$. In this form of the invention the lower edge of said bushing $h$ engages the flange $f^3$ and forces it tightly against the packing ring $k$ with the end of the opening $c'$ in direct alinement with the opening $f'$ in the shell $f$.

The operation of the herein described device is substantially as follows:—

When it is desired to test the compression of any cylinder, the spark plug is removed therefrom and the fitting $c$ mounted in the spark plug opening $b$ in the same manner that a spark plug is applied thereto. If a push tire pressure gage be used, this gage is placed with the opening $f'$ alined with the opening $c'$ through the plug $c$, and the bushing $h$ is slipped over the gage and tightened up so as to secure a tight joint about said opening $c'$. This manner of attaching the entire gage to the cylinder insures the proper positioning of parts and their remaining in position without further attention. If a gage having a screw socket is used, this screw socket is applied to the nipple $e$ in a manner to secure the desired tight joint. The engine is then started preferably by hand so as to reciprocate the pistons in the cylinder to which the fitting $c$ is attached in a manner to develop the normal pressure in said cylinder, the pressure within the cylinder actuating the gage in a manner to cause the movable member $g$ to slide upon the shell $f$ and come to rest in position so that the graduations thereon indicate approximately the pressure applied to the gage. If desired the gage may be restored to normal and this operation repeated two or more times to determine whether or not there is any variance in the pressure upon succeeding compression strokes of the piston of that cylinder. By repeating this operation with the different cylinders, the relative compression of said cylinders may be determined.

In the modification shown in Fig. 4, the operation is the same as above described with the exception that instead of packing against the face of the nipple $e$, the gage proper contacts directly against the packing ring $k$.

I prefer to use the form of the invention shown in Figs. 1 to 3 because in this form of the invention the plug fitting $c$ is adapted for use with any type of tire gage and one object of the invention is to provide for automobile use a gage which may be used both in determining the tire pressures and in testing the engine cylinders.

When it is desired to determine the efficiency of the piston rings, the spark plug is removed, and the plug $c$ substituted therefor, in the manner above referred to and the fitting $c$ is connected by means of the nipple $i$ with a pump or other means for developing the required pressure. Pressure is then developed in the cylinder and as the pressure in the cylinder increases the movable member $g$ of the tire pressure gage will indicate this increase of pressure until the maximum desired test pressure has been applied to the cylinder. Then the pump or other pressure developing means may either be cut off, or disconnected from the nipple $i$, the valve $j$ in said nipple holding this pressure. If there be any subsequent leakage about the piston rings, this may be determined by applying pressure to the movable member $g$ of the gage proper.

It will be observed that by the mechanism herein described, I secure in a single instrument a compression gage and piston ring test gage and a tire gage, the gage $f—g$ being capable of being removed from the fitting $c$ so as to permit its use upon a tire in the ordinary manner.

The details of construction of the gage used is immaterial, it being merely necessary that the gage should automatically set under maximum pressure in order to permit the convenient actuation of the engine or pump and subsequent reading of the gage. In other words, with a gage made in accordance with my invention, it is not necessary to take the reading of the pressures while the engine is in motion.

It is not my intention to limit the invention to the precise details of construction shown in the accompanying drawings, it being apparent that such may be varied without departing from the spirit and scope of the invention.

Having described the invention what I claim as new and desire to have protected by Letters Patent is:—

1. A pressure gage for engine cylinders comprising a plug adapted to be secured in the spark plug or other opening of an internal combustion engine cylinder, said plug having an opening extending axially therethrough, a chamber at the top thereof, a pressure gage comprising a fixed member adapted to enter said chamber and a movable member responsive to the pressure gases passing through the opening in said plug, said fixed member having thereon a laterally projecting flange, coöperating means carried by said fixed gage member and said plug whereby a suitable packing is formed to limit the application of pressures through said opening to the movable member of said gage, and a bushing adapted to operatively engage the flange upon said fixed gage member to force and hold said gage member in the operative relation to said packing means, said plug and said bushing being provided with coöperating means whereby said gage member is detachably connected by means of said bushing with said plug.

2. A pressure gage for engine cylinders comprising a plug adapted to be secured in the spark plug or other opening of an internal combustion engine cylinder, a partition in said plug whereby a chamber is formed at the top thereof, said partition being provided with a screw threaded nipple having its top finished to form a packing ring, an opening extending axially through said partition and said nipple, and a pressure gage provided with means whereby it may be detachably mounted with relation to said nipple.

3. A pressure gage for engine cylinders comprising a plug adapted to be secured in the spark plug or other opening of an internal combustion engine cylinder, said plug having an opening extending axially therethrough, a pressure gage, coöperating means carried by said pressure gage and said plug whereby a suitable packing is formed to limit the application of pressures through said opening to said gage, and a nipple communicating with the opening in said plug below the point of communication with said gage whereby gas may be forced into the cylinder through said nipple and the pressure developed within the cylinder indicated by said gage.

4. A pressure gage for engine cylinders comprising a plug adapted to be secured in the spark plug opening of an internal combustion engine cylinder, said plug having an opening extending axially therethrough, a pressure gage, coöperating means carried by said pressure gage and said plug whereby a suitable packing is formed to limit the application of pressure through said opening to said gage, a nipple communicating with the opening in said plug below the point of communication with said gage and a check valve in said opening whereby gas may be forced into the cylinder through said nipple and the pressure developed within the cylinder indicated by said gage.

5. A pressure gage for engine cylinders comprising a plug adapted to be secured in the spark plug or other opening of an internal combustion engine cylinder, said plug having an opening extending axially therethrough, a pressure gage detachably mounted in said plug, coöperating means carried by said pressure gage and said plug whereby a suitable packing is formed to limit the application of pressures through said opening to said gage, and a nipple communicating with the opening in said plug below the point of communication with said gage whereby gas may be forced into the cylinder through said nipple and the pressure developed within the cylinder indicated by said gage.

6. A pressure gage for engine cylinders comprising a plug adapted to be secured in the spark plug or other opening of an internal combustion engine cylinder, said plug having an opening extending axially therethrough, a pressure gage comprising a fixed member and a movable member responsive to the pressure of gases passing through the openings in said plug, coöperating means carried by said fixed gage member and said plug whereby a suitable packing is formed to limit the application of pressures through said opening to the movable member of said gage, means whereby said fixed gage member is detachably secured with relation to said plug, and a nipple communicating with the opening in said plug below the point of communication with said gage, whereby gas may be forced into the cylinder through said nipple and the pressure developed within the cylinder indicated by said gage.

In witness whereof I have hereunto affixed my signature in the presence to two subscribing witnesses, this 7th day of December, 1915.

AMOS H. SMITH.

Witnesses:
F. T. WENTWORTH,
CLARICE FRANCK.